United States Patent [19]
Ku

[11] Patent Number: 5,769,914
[45] Date of Patent: Jun. 23, 1998

[54] ACCUMULATOR/FILTER ASSEMBLY OF COMPRESSOR FOR COOLANT

[75] Inventor: Lei Ku, Taoyuan County, Taiwan

[73] Assignee: Divine Pill Industrial Co., Ltd., Taipei, Taiwan

[21] Appl. No.: 656,978

[22] Filed: Jun. 6, 1996

[51] Int. Cl.$^6$ .................................................. B01D 50/00
[52] U.S. Cl. ................................ 55/320; 55/330; 55/503; 55/505
[58] Field of Search ........................... 55/320, 327, 330, 55/503, 505

[56] References Cited

U.S. PATENT DOCUMENTS

| | | | |
|---|---|---|---|
| 1,833,919 | 12/1931 | Sisson | 55/505 |
| 1,839,379 | 1/1932 | Downing | 55/503 |
| 2,467,143 | 4/1949 | Mitchell | 55/505 |
| 4,256,474 | 3/1981 | Berger, Jr. et al. | 55/503 |
| 4,259,097 | 3/1981 | Patel et al. | 55/503 |
| 4,706,454 | 11/1987 | Smith, Jr. | 55/330 |
| 4,731,178 | 3/1988 | Rosenberg | 55/503 |
| 5,135,551 | 8/1992 | Fielding | 55/320 |

FOREIGN PATENT DOCUMENTS

| | | | |
|---|---|---|---|
| 25897 | 12/1908 | United Kingdom | 55/503 |

*Primary Examiner*—C. Scott Bushey
*Attorney, Agent, or Firm*—Baker & Botts, L.L.P.

[57] ABSTRACT

An accumulator/filter assembly is disclosed to have an accumulator and a tubular filter. The accumulator is tapered towards the first and second ends. The tubular filter includes a first end connected with the first end of the accumulator and a second end connected with the second end of the accumulator. A pipe includes a first end connected with the second end of the tubular filter, a second end connected with the second end of the accumulator and at least one aperture defined therein. The pipe is connected with the tubular filter in a manner that a longitudinal fluid communication between them is blocked.

3 Claims, 2 Drawing Sheets

ACCUMULATOR/FILTER ASSEMBLY OF COMPRESSOR FOR COOLANT

BACKGROUND OF THE INVENTION

1. Field of the Invention

This invention relates to a cooler such as a refrigerator or an air conditioner and, more particularly, to an accumulator/filter assembly of a compressor for coolant which is used in the cooler.

2. Related Prior Art

Referring to FIG. 2, there is shown an accumulator/filter assembly in accordance with prior art. The accumulator/filter assembly includes an accumulator and a disk-shaped filter 15 which is received in the accumulator.

The accumulator consists of a first cylinder 11 and a second cylinder 12 which are separately produced. The first and second cylinders 11 and 12 are assembled after the disk-shaped filter 15 is received in the first cylinder 11.

The first cylinder 11 includes opposite first and second ends. An aperture is defined in a wall which is formed at the first end of the first cylinder 11. An opening is defined in the second end of the first cylinder 11.

The second cylinder 12 includes opposite first and second ends. An opening is defined in the first end of the second cylinder 12. An aperture is defined in a wall which is formed at the second end of the second cylinder 12.

A fastener 14 includes a plurality of apertures which are defined therein. A rim of the fastener 14 is connected with a rim of the disk-shaped filter 15. The fastener 14 and the disk-shaped filter 15 are pressed into the first cylinder 11.

The second end of the first cylinder 11 is firmly connected with the first end of the second cylinder 12 by means of brazing after the disk-shaped filter 15 is received in the first cylinder 11. Thus, the accumulator is divided into first and second chambers by means of the disk-shaped filter 15.

An inlet 16 is partly inserted into the first chamber of the accumulator through the aperture which is defined in the wall of the first cylinder 11. The first cylinder 11 and the inlet 16 are bonded by means of brazing. A pipe 13 is inserted into the second chamber of the container through the aperture which is defined in the wall of the second cylinder 12. The second cylinder 12 is connected with the pipe 13 by means of silver welding.

The pipe 13 is mounted on the wall of the second cylinder 12 like a cantilever. Hence, operation of a compressor and this conventional accumulator/filter assembly inevitably entails a lot of vibration of the pipe 13 and resulting noise, which is the primary drawback of this conventional accumulator/filter assembly. The present invention is intended to solve this problem.

SUMMARY OF THE INVENTION

The primary objective of the present invention is to provide an accumulator/filter assembly which remains quiet when co-operating with a compressor.

The accumulator/filter assembly includes an accumulator and a tubular filter. The accumulator is tapered towards the first and second ends. The tubular filter includes a first end connected with the first end of the accumulator and a second end connected with a first end of a pipe. The pipe includes a first end connected with the second end of the tubular filter, a second end connected with the second end of the accumulator and at least one aperture defined therein. The pipe is connected with the tubular filter in a manner that a longitudinal fluid communication between them is blocked.

BRIEF DESCRIPTION OF THE DRAWINGS

The present invention will be described in detail with reference to the attached drawings in which.

DETAILED DESCRIPTION OF THE PREFERRED EMBODIMENT

Figure 1:
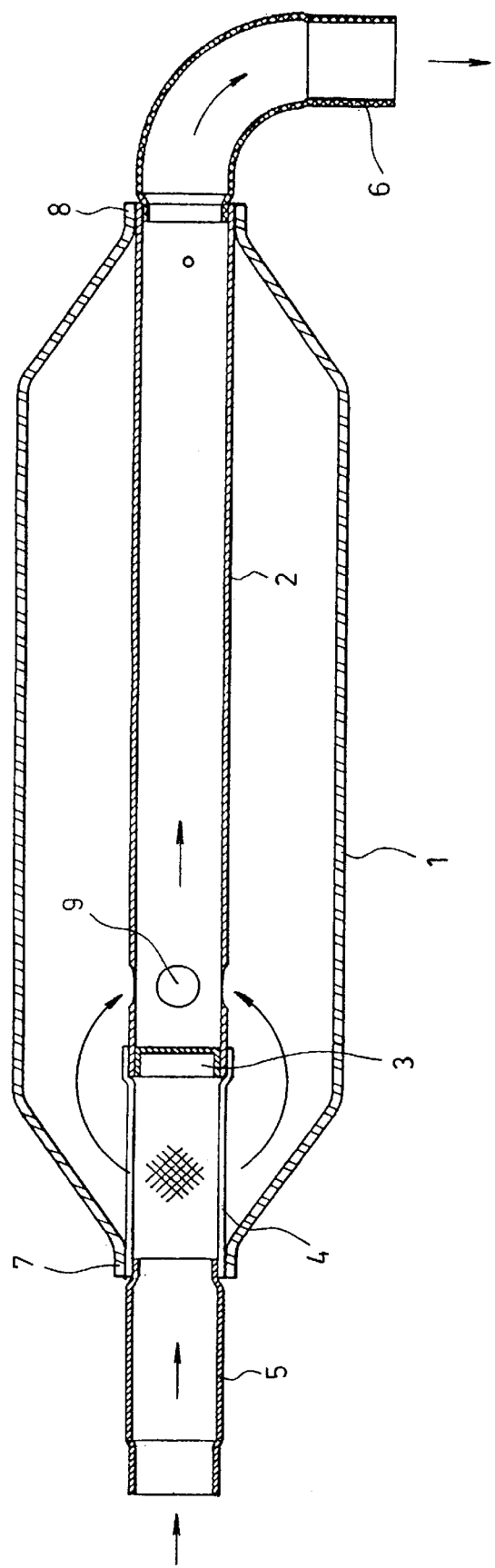
FIG. 1 is a cross-sectional view of the preferred embodiment of an accumulator/filter assembly in accordance with the present invention.
Figure 2:
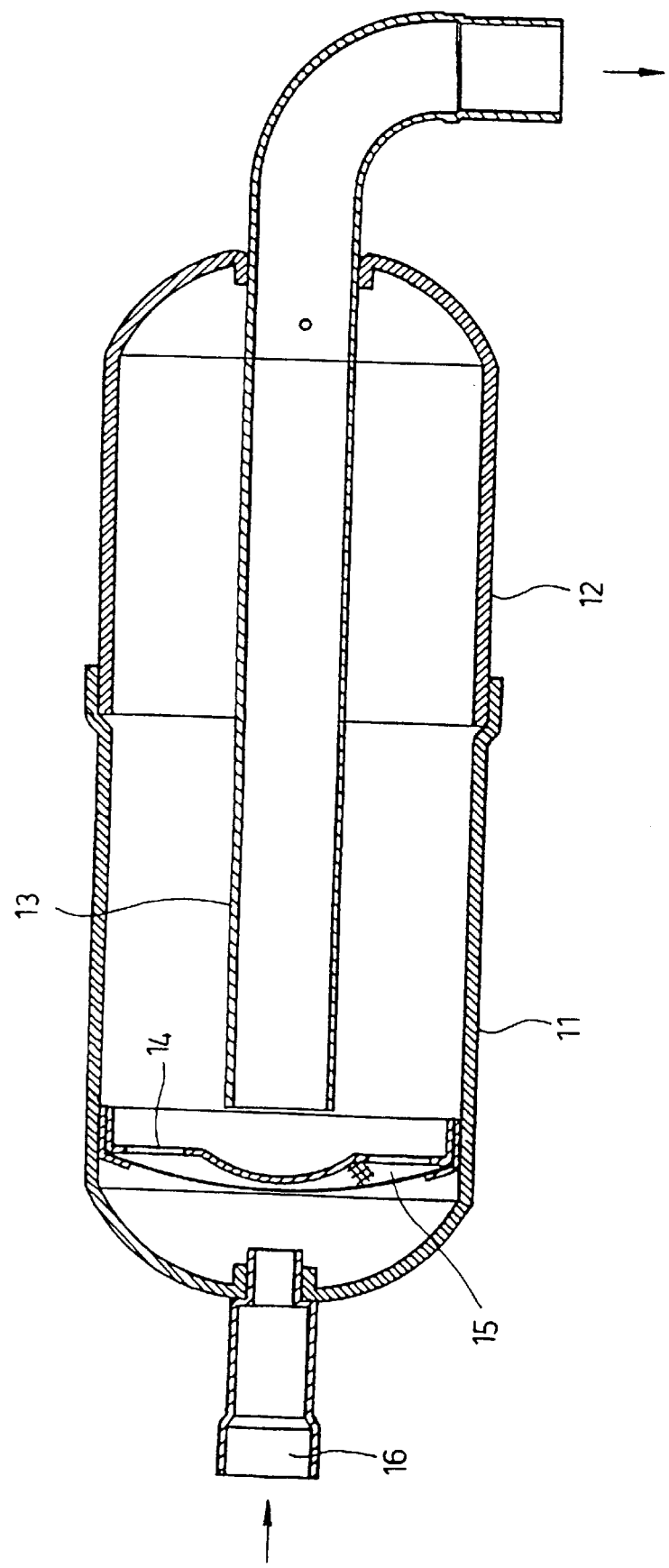
FIG. 2 is a cross-sectional view of a accumulator/filter assembly in accordance with prior art.

Referring to FIG. 1, there is shown the preferred embodiment of the accumulator/filter assembly in accordance with the present invention. The accumulator/filter assembly includes an accumulator 1 and a tubular filter 4 which is received in the accumulator 1.

The accumulator 1 is a one-piece element. The accumulator 1 has a cylindrical configuration which is tapered towards opposite first and second open ends 7 and 8.

A pipe 2 includes opposite first and second open ends. A plurality of apertures 9 are defined in the pipe 2 near the first open end of the same.

A plug 3 is pressed into and consequently retained in the first open end of the pipe 2 for purposes of sealing.

The tubular filter 4 has opposite first and second open ends. The first open end of the pipe 2 is inserted into the second open end of the tubular filter 4. The first open end of the pipe 2 and the second open end of the tubular filter 4 are bonded by appropriate means.

The pipe 2 and the tubular filter 4 are received in the accumulator 1. The first open end of the tubular filter 4 is firmly connected with the first open end of the accumulator 1 by appropriate means while the second open end of the pipe 2 is firmly connected with the second open end of the accumulator 1 by appropriate means.

An open end of an inlet 5 is inserted into and firmly connected with the first open end of the tubular filter 4 by appropriate means. An open end of an outlet 6 is inserted into and firmly connected with the second open end of the pipe 2 by appropriate means.

In operation, coolant is circulated in a direction which is indicated with the arrows which are shown in FIG. 1. The coolant is introduced into the interior of the tubular filter 4 through the inlet 5. The coolant is filtered when flowing from the interior to the exterior of the tubular filter 4. The coolant flows from the exterior to the interior of the pipe 2 through the apertures 9 and then flows through the outlet 6. It should be noted that the coolant cannot longitudinally flow from the tubular filter 4 to the pipe 2 due to the plug 3.

In the preferred embodiment, the pipe 2 is produced with first and second open ends and the first open end is sealed by means of the plug 3. Nonetheless, the pipe 2 can be produced with an open end and a closed end in another embodiment so that the plug 3 can be eliminated.

In the preferred embodiment, the plug 3 is received in the pipe 2 which is partly inserted into the tubular filter 4. Nevertheless, the plug 3 can be pressed into the tubular filter 4 and the tubular filter 4 is partly inserted into the pipe 2 in another embodiment. In still another embodiment, the tubular filter 4 can be produced with an open end and a closed end which is pressed into the pipe 2. Thus, the plug 3 can be eliminated.

In this invention, the pipe 2 is firmly connected with the tubular filter 4 while the pipe 2 and the tubular filter 4 are both linked to the accumulator 1. Thus, the problem which is related to vibration of the pipe and resulting noise is obviated.

I claim:

1. An accumulator/filter assembly for a coolant compressor of a refrigerator or air conditioner comprising:

an accumulator including first and second ends, the accumulator being tapered towards the first and second ends and having a first opening at the first end and a second opening at the second end;

a tubular filter including first and second ends, the first end being in communication with the first opening and being firmly connected with the first end of the accumulator;

a pipe including a first end firmly connected with and received telescopically in the second end of the tubular filter, a second end in communication with the second opening and firmly connected with the second end of the accumulator, and at least one aperture defined therein; and a plug received telescopically in the first end of the pipe and blocking longitudinal fluid communication between the filter and the pipe.

2. An accumulator/filter assembly in accordance with claim 1 including an inlet with a distal end in fluid communication with the first end of the tubular filter and rigidly connected to the first end of the accumulator.

3. An accumulator/filter assembly in accordance with claim 1 including an outlet with a distal end in fluid communication with the second end of the pipe and firmly connected with the second end of the accumulator.

* * * * *